US007938181B2

(12) United States Patent
Dusterhoft et al.

(10) Patent No.: US 7,938,181 B2
(45) Date of Patent: May 10, 2011

(54) METHOD AND COMPOSITION FOR ENHANCING COVERAGE AND DISPLACEMENT OF TREATMENT FLUIDS INTO SUBTERRANEAN FORMATIONS

(75) Inventors: Ronald G. Dusterhoft, Katy, TX (US); Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/701,907

(22) Filed: Feb. 8, 2010

(65) Prior Publication Data

US 2010/0147518 A1 Jun. 17, 2010

Related U.S. Application Data

(63) Continuation of application No. 10/961,508, filed on Oct. 8, 2004, now Pat. No. 7,757,768.

(51) Int. Cl.
E21B 49/00 (2006.01)
(52) U.S. Cl. .................. 166/250.1; 166/305.1; 166/295; 166/300
(58) Field of Classification Search ............... 166/305.1, 166/250.1, 295, 300
See application file for complete search history.

(56) References Cited

U.S. PATENT DOCUMENTS

| 2,238,671 A | 4/1941 | Woodhouse ................ 166/21 |
| 2,703,316 A | 3/1955 | Schneider .................. 260/78.3 |
| 2,869,642 A | 1/1959 | McKay et al. |
| 3,047,067 A | 7/1962 | Williams et al. ............. 166/33 |
| 3,176,768 A | 4/1965 | Brandt et al. ............... 166/33 |
| 3,272,650 A | 9/1966 | MacVittle .................. 134/7 |
| 3,297,086 A | 1/1967 | Spain ....................... 166/33 |
| 3,316,965 A | 5/1967 | Watanabe .................. 166/33 |
| 3,375,872 A | 4/1968 | McLaughlin et al. ......... 166/29 |
| 3,404,735 A | 10/1968 | Young et al. ................ 166/33 |
| 3,415,320 A | 12/1968 | Young ...................... 166/33 |
| 3,492,147 A | 1/1970 | Young et al. ................ 117/62.2 |
| 3,659,651 A | 5/1972 | Graham .................... 166/280 |
| 3,681,287 A | 8/1972 | Brown et al. ............... 260/67 |
| 3,754,598 A | 8/1973 | Holloway, Jr. .............. 166/249 |
| 3,765,804 A | 10/1973 | Brandon ................... 417/540 |
| 3,768,564 A | 10/1973 | Knox et al. ................ 166/307 |
| 3,784,585 A | 1/1974 | Schmitt et al. ............. 260/861 |
| 3,819,525 A | 6/1974 | Hattenbrun ................ 252/132 |
| 3,828,854 A | 8/1974 | Templeton et al. .......... 166/307 |
| 3,842,911 A | 10/1974 | Know et al. ............... 166/307 |
| 3,854,533 A | 12/1974 | Gurley et al. .............. 166/276 |
| 3,857,444 A | 12/1974 | Copeland ................. 166/276 |
| 3,863,709 A | 2/1975 | Fitch ....................... 165/1 |
| 3,868,998 A | 3/1975 | Lybarger et al. ............ 166/278 |
| 3,888,311 A | 6/1975 | Cooke, Jr. ................. 166/280 |
| 3,912,692 A | 10/1975 | Casey et al. ............... 260/78.3 |
| 3,948,672 A | 4/1976 | Harnberger ................ 106/90 |
| 3,955,993 A | 5/1976 | Curtice .................... 106/90 |
| 3,960,736 A | 6/1976 | Free et al. ................. 252/8.55 R |
| 4,008,763 A | 2/1977 | Lowe, Jr. .................. 166/253 |
| 4,015,995 A | 4/1977 | Hess ....................... 106/287 |
| 4,029,148 A | 6/1977 | Emery ..................... 166/250.1 |
| 4,042,032 A | 8/1977 | Anderson et al. ........... 166/276 |
| 4,070,865 A | 1/1978 | McLaughlin ............... 61/36 |
| 4,074,760 A | 2/1978 | Copeland et al. ........... 166/276 |
| 4,085,801 A | 4/1978 | Sifferman ................. 166/295 |
| 4,127,173 A | 11/1978 | Watkins et al. ............. 166/276 |
| 4,169,798 A | 10/1979 | DeMartino ................ 252/8.55 R |
| 4,172,066 A | 10/1979 | Zweigle et al. ............. 260/29.6 TA |
| 4,245,702 A | 1/1981 | Haafkens et al. ........... 166/307 |
| 4,273,187 A | 6/1981 | Satter et al. ............... 166/250 |
| 4,291,766 A | 9/1981 | Davies et al. .............. 166/276 |
| 4,305,463 A | 12/1981 | Zakiewicz ................. 106/245 |
| 4,336,842 A | 6/1982 | Graham et al. ............. 166/276 |
| 4,352,674 A | 10/1982 | Fery ....................... 23/230 |
| 4,353,806 A | 10/1982 | Canter et al. .............. 507/229 |
| 4,387,769 A | 6/1983 | Erbstoesser et al. ......... 166/276 |
| 4,415,805 A | 11/1983 | Fertl et al. ................. 250/260 |
| 4,439,489 A | 3/1984 | Johnson et al. ............. 428/404 |
| 4,443,347 A | 4/1984 | Underdown et al. ........ 252/8.55 R |
| 4,460,052 A | 7/1984 | Gockel .................... 175/72 |
| 4,470,915 A | 9/1984 | Conway .................. 252/8.55 R |

(Continued)

FOREIGN PATENT DOCUMENTS

CA 2063877 5/2003

(Continued)

OTHER PUBLICATIONS

"Santrol Bioballs"; http://www.fairmounrninerals.com/.sub.-SANTROUSANTROL%20Web%20Site/B.sub-.-TD.htm., Sep. 30, 2004.
International Search Report and Opinion (PCT/GB2004/002412), Sep. 16, 2004.
International Search Report (CPW 21582 EP), Mar. 11, 2005.
International Search Report and Opinion (PCT/GB2004/001497), Jul. 20, 2004.
International Search Report and Opinion (PCT/GB2004/001842), Dec. 10, 2004.
International Search Report and Opinion (PCT/GB2004/002674), Dec. 16, 2004.

(Continued)

Primary Examiner — William P Neuder
Assistant Examiner — Nicole A Coy
(74) Attorney, Agent, or Firm — Robert A. Kent; McDermott Will & Emery LLP

(57) ABSTRACT

A method of injecting a treatment fluid into a portion of a subterranean formation, comprising providing a treatment fluid having a viscosity; determining the breakdown pressure of the portion of the subterranean formation; calculating the maximum sustainable flow rate for the treatment fluid; and, injecting the treatment fluid into the portion of the subterranean formation at a flow rate less than or equal to the maximum sustainable flow rate for the treatment fluid. A method of injecting a treatment fluid into a portion of a subterranean formation, comprising providing a treatment fluid having a viscosity; determining the breakdown pressure of the portion of the subterranean formation; calculating the maximum allowable treatment fluid viscosity; adjusting the viscosity of the treatment fluid to a viscosity less than or equal to the maximum allowable treatment fluid viscosity; and injecting the treatment fluid into the subterranean formation at the selected treatment fluid flow rate.

20 Claims, No Drawings

U.S. PATENT DOCUMENTS

| | | | |
|---|---|---|---|
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstoesser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,585,064 A | 4/1986 | Graham et al. | 166/280 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/276 |
| 4,969,523 A | 11/1990 | Martin et al. | 166/278 |
| 4,986,353 A | 1/1991 | Clark et al. | 168/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,107,928 A | 4/1992 | Hilterhaus | 166/293 |
| 5,128,390 A | 7/1992 | Murphey et al. | 523/130 |
| 5,135,051 A | 8/1992 | Facteau et al. | 166/104 |
| 5,142,023 A | 8/1992 | Gruber et al. | 528/354 |
| 5,165,438 A | 11/1992 | Facteau et al. | 137/1 |
| 5,173,527 A | 12/1992 | Calve | 524/74 |
| 5,178,218 A | 1/1993 | Dees | 166/280 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Csabai et al. | 521/63 |
| 5,232,961 A | 8/1993 | Murphey et al. | 523/414 |
| 5,238,068 A | 8/1993 | Fredrickson | 166/307 |
| 5,247,059 A | 9/1993 | Gruber et al. | 528/354 |
| 5,249,628 A | 10/1993 | Surjaatmadia | 166/305 |
| 5,256,729 A | 10/1993 | Kutts et al. | 524/700 |
| 5,273,115 A | 12/1993 | Spafford | 166/281 |
| 5,285,849 A | 2/1994 | Surles et al. | 168/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,322,123 A | 6/1994 | Kohler et al. | |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constien | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,692,566 A | 12/1997 | Surles | 166/295 |
| 5,697,440 A | 12/1997 | Weaver et al. | 166/281 |
| 5,698,322 A | 12/1997 | Tsai et al. | 428/373 |
| 5,712,314 A | 1/1998 | Suries et al. | 521/41 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Surles | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |

| Patent No. | Date | Inventor | Class |
|---|---|---|---|
| 5,839,510 A | 11/1998 | Weaver et al. ............... 166/276 |
| 5,840,784 A | 11/1998 | Funkhouser et al. ......... 523/130 |
| 5,849,401 A | 12/1998 | El-Afandi et al. ............ 428/215 |
| 5,849,590 A | 12/1998 | Anderson, II et al. ......... 436/27 |
| 5,853,048 A | 12/1998 | Weaver et al. ............... 166/279 |
| 5,864,003 A | 1/1999 | Qureshi et al. ............... 528/141 |
| 5,865,936 A | 2/1999 | Edelman et al. .............. 156/310 |
| 5,871,049 A | 2/1999 | Weaver et al. ............... 166/276 |
| 5,873,413 A | 2/1999 | Chatterji et al. .............. 166/293 |
| 5,875,844 A | 3/1999 | Chatterji et al. .............. 166/293 |
| 5,875,845 A | 3/1999 | Chatterji et al. .............. 166/293 |
| 5,875,846 A | 3/1999 | Chatterji et al. .............. 166/293 |
| 5,893,383 A | 4/1999 | Fracteau ...................... 137/14 |
| 5,893,416 A | 4/1999 | Read .......................... 166/304 |
| 5,908,073 A | 6/1999 | Nguyen et al. ............... 166/276 |
| 5,911,282 A | 6/1999 | Onan et al. ..................... 175/72 |
| 5,916,933 A | 6/1999 | Johnson et al. ............... 523/208 |
| 5,921,317 A | 7/1999 | Dewprashad et al. ........ 166/208 |
| 5,924,488 A | 7/1999 | Nguyen et al. ............... 166/280 |
| 5,929,437 A | 7/1999 | Elliott et al. .................. 250/259 |
| 5,944,105 A | 8/1999 | Nguyen ........................ 166/278 |
| 5,945,387 A | 8/1999 | Chatterji et al. .............. 507/224 |
| 5,948,734 A | 9/1999 | Sinclair et al. ............... 507/219 |
| 5,957,204 A | 9/1999 | Chatterji et al. .............. 166/295 |
| 5,960,877 A | 10/1999 | Funkhouser et al. ......... 166/270 |
| 5,960,880 A | 10/1999 | Nguyen et al. ............... 168/280 |
| 5,964,291 A | 10/1999 | Bourne et al. ................ 166/279 |
| 5,969,006 A | 10/1999 | Onan et al. .................... 523/166 |
| 5,969,523 A | 10/1999 | Chung et al. ................. 166/278 |
| 5,977,283 A | 11/1999 | Rossitto ........................ 528/44 |
| 5,994,785 A | 11/1999 | Higuchi et al. ............... 527/789 |
| RE36,466 E | 12/1999 | Nelson et al. ................ 166/280 |
| 6,003,600 A | 12/1999 | Nguyen et al. ............... 166/281 |
| 6,004,400 A | 12/1999 | Bishop et al. ................. 134/2 |
| 6,006,835 A | 12/1999 | Onan et al. .................... 166/295 |
| 6,006,836 A | 12/1999 | Chatterji et al. .............. 166/295 |
| 6,012,524 A | 1/2000 | Chatterji et al. .............. 166/295 |
| 6,016,870 A | 1/2000 | Dewprashad et al. ........ 166/295 |
| 6,024,170 A | 2/2000 | McCabe et al. ............... 166/300 |
| 6,028,113 A | 2/2000 | Scepanski ..................... 514/643 |
| 6,028,534 A | 2/2000 | Ciglenec et al. ............. 340/856.2 |
| 6,040,398 A | 3/2000 | Kinsho et al. ................ 525/527 |
| 6,047,772 A | 4/2000 | Weaver et al. ............... 166/276 |
| 6,059,034 A | 5/2000 | Rickards et al. .............. 166/280 |
| 6,059,035 A | 5/2000 | Chatterji et al. .............. 166/293 |
| 6,059,036 A | 5/2000 | Chatterji et al. .............. 166/294 |
| 6,068,055 A | 5/2000 | Chatterji et al. .............. 166/293 |
| 6,069,117 A | 5/2000 | Onan et al. .................... 507/202 |
| 6,074,739 A | 6/2000 | Katagiri ........................ 428/323 |
| 6,079,492 A | 6/2000 | Hoogteijling et al. ........ 166/276 |
| 6,098,711 A | 8/2000 | Chatterji et al. .............. 166/294 |
| 6,114,410 A | 9/2000 | Betzold ........................ 523/130 |
| 6,123,871 A | 9/2000 | Carroll ........................ 252/301.36 |
| 6,123,965 A | 9/2000 | Jacob et al. .................. 424/489 |
| 6,124,246 A | 9/2000 | Heathman et al. ........... 507/219 |
| 6,130,286 A | 10/2000 | Thomas et al. ............... 524/507 |
| 6,135,987 A | 10/2000 | Tsai et al. ..................... 604/365 |
| 6,140,446 A | 10/2000 | Fujiki et al. .................. 528/15 |
| 6,148,911 A | 11/2000 | Gipson et al. ................ 166/248 |
| 6,152,234 A | 11/2000 | Newhouse et al. ........... 166/403 |
| 6,162,766 A | 12/2000 | Muir et al. .................... 507/267 |
| 6,169,058 B1 | 1/2001 | Le et al. ....................... 507/222 |
| 6,172,011 B1 | 1/2001 | Card et al. .................... 507/204 |
| 6,172,077 B1 | 1/2001 | Curtis et al. .................. 514/278 |
| 6,176,315 B1 | 1/2001 | Reddy et al. ................. 168/295 |
| 6,177,484 B1 | 1/2001 | Surles .......................... 523/131 |
| 6,184,311 B1 | 2/2001 | O'Keeffe et al. ............. 525/438 |
| 6,187,834 B1 | 2/2001 | Thayer et al. ................. 522/15 |
| 6,187,839 B1 | 2/2001 | Eoff et al. ..................... 523/130 |
| 6,189,615 B1 | 2/2001 | Sydansk ....................... 166/270 |
| 6,192,985 B1 | 2/2001 | Hinkel et al. ................. 166/280 |
| 6,192,986 B1 | 2/2001 | Urlwin-Smith ............... 166/295 |
| 6,196,317 B1 | 3/2001 | Hardy .......................... 166/295 |
| 6,202,751 B1 | 3/2001 | Chatterji et al. .............. 166/276 |
| 6,209,643 B1 | 4/2001 | Nguyen et al. ............... 166/276 |
| 6,209,644 B1 | 4/2001 | Brunet .......................... 166/297 |
| 6,209,646 B1 | 4/2001 | Reddy et al. ................. 166/300 |
| 6,210,471 B1 | 4/2001 | Craig ........................... 106/31.08 |
| 6,214,773 B1 | 4/2001 | Harris et al. .................. 507/271 |
| 6,231,644 B1 | 5/2001 | Chatterji et al. .............. 106/724 |
| 6,234,251 B1 | 5/2001 | Chatterji et al. .............. 166/295 |
| 6,238,597 B1 | 5/2001 | Yim et al. ..................... 252/512 |
| 6,241,019 B1 | 6/2001 | Davidson et al. ............. 166/249 |
| 6,242,390 B1 | 6/2001 | Mitchell et al. ............... 507/211 |
| 6,244,344 B1 | 6/2001 | Chatterji et al. .............. 166/295 |
| 6,257,335 B1 | 7/2001 | Nguyen et al. ............... 166/280 |
| 6,260,622 B1 | 7/2001 | Blok et al. .................... 166/305.1 |
| 6,271,181 B1 | 8/2001 | Chatterji et al. .............. 507/219 |
| 6,274,650 B1 | 8/2001 | Cui ............................... 523/457 |
| 6,279,652 B1 | 8/2001 | Chatterji et al. .............. 166/194 |
| 6,279,656 B1 | 8/2001 | Sinclair et al. ............... 166/310 |
| 6,283,214 B1 | 9/2001 | Guinot et al. ................. 166/297 |
| 6,302,207 B1 | 10/2001 | Nguyen et al. ............... 166/276 |
| 6,306,998 B1 | 10/2001 | Kimura et al. ................ 528/12 |
| 6,311,773 B1 | 11/2001 | Todd et al. .................... 166/280 |
| 6,321,841 B1 | 11/2001 | Eoff et al. ..................... 166/291 |
| 6,323,307 B1 | 11/2001 | Bigg et al. .................... 528/354 |
| 6,326,458 B1 | 12/2001 | Gruber et al. ................. 528/354 |
| 6,328,105 B1 | 12/2001 | Betzold ........................ 166/280 |
| 6,328,106 B1 | 12/2001 | Griffith et al. ................ 166/295 |
| 6,330,916 B1 | 12/2001 | Rickards et al. .............. 166/280 |
| 6,330,917 B2 | 12/2001 | Chatterji et al. .............. 166/295 |
| 6,350,309 B2 | 2/2002 | Chatterji et al. .............. 106/677 |
| 6,357,527 B1 | 3/2002 | Norman et al. ............... 166/300 |
| 6,364,018 B1 | 4/2002 | Brannon et al. .............. 166/280.2 |
| 6,364,945 B1 | 4/2002 | Chatterji et al. .............. 106/677 |
| 6,367,165 B1 | 4/2002 | Huttlin .......................... 34/582 |
| 6,367,549 B1 | 4/2002 | Chatterji et al. .............. 166/292 |
| 6,372,678 B1 | 4/2002 | Youngsman et al. ......... 504/128 |
| 6,376,571 B1 | 4/2002 | Chawla et al. ................ 522/64 |
| 6,387,986 B1 | 5/2002 | Moradi-Araghi et al. .... 523/211 |
| 6,390,195 B1 | 5/2002 | Nguyen et al. ............... 166/276 |
| 6,401,817 B1 | 6/2002 | Griffith et al. ................ 166/295 |
| 6,405,797 B2 | 6/2002 | Davidson et al. ............. 166/249 |
| 6,406,789 B1 | 6/2002 | McDaniel et al. ............ 428/403 |
| 6,408,943 B1 | 6/2002 | Schultz et al. ................ 166/285 |
| 6,422,314 B1 | 7/2002 | Todd et al. .................... 166/312 |
| 6,439,309 B1 | 8/2002 | Matherly et al. ............. 166/276 |
| 6,439,310 B1 | 8/2002 | Scott, III et al. .............. 166/308 |
| 6,440,255 B1 | 8/2002 | Kohlhammer et al. ....... 156/283 |
| 6,446,727 B1 | 9/2002 | Zemlak et al. ................ 166/308 |
| 6,448,206 B1 | 9/2002 | Griffith et al. ................ 507/219 |
| 6,450,260 B1 | 9/2002 | James et al. .................. 166/277 |
| 6,454,003 B1 | 9/2002 | Chang et al. .................. 166/270 |
| 6,458,885 B1 | 10/2002 | Stengel et al. ................ 524/507 |
| 6,485,947 B1 | 11/2002 | Rajgarhia et al. ............. 435/139 |
| 6,488,091 B1 | 12/2002 | Weaver et al. ............... 166/300 |
| 6,488,763 B2 | 12/2002 | Brothers et al. .............. 106/692 |
| 6,494,263 B2 | 12/2002 | Todd ............................ 166/312 |
| 6,503,870 B2 | 1/2003 | Griffith et al. ................ 507/219 |
| 6,508,305 B1 | 1/2003 | Brannon et al. .............. 166/293 |
| 6,527,051 B1 | 3/2003 | Reddy et al. ................. 166/300 |
| 6,528,157 B1 | 3/2003 | Hussain et al. ............... 428/325 |
| 6,531,427 B1 | 3/2003 | Shuchart et al. .............. 507/267 |
| 6,538,576 B1 | 3/2003 | Schultz et al. ................ 340/859.6 |
| 6,543,545 B1 | 4/2003 | Chatterji et al. .............. 166/381 |
| 6,552,333 B1 | 4/2003 | Storm et al. .................. 250/269.3 |
| 6,554,071 B1 | 4/2003 | Reddy et al. ................. 166/293 |
| 6,555,507 B2 | 4/2003 | Chatterji et al. .............. 507/219 |
| 6,569,814 B1 | 5/2003 | Brady et al. .................. 507/201 |
| 6,582,819 B2 | 6/2003 | McDaniel et al. ............ 428/402 |
| 6,593,402 B2 | 7/2003 | Chatterji et al. .............. 524/7 |
| 6,599,863 B1 | 7/2003 | Palmer et al. ................. 507/219 |
| 6,608,162 B1 | 8/2003 | Chiu et al. .................... 528/129 |
| 6,616,320 B2 | 9/2003 | Huber et al. .................. 366/156.2 |
| 6,620,857 B2 | 9/2003 | Valet ............................ 522/42 |
| 6,626,241 B2 | 9/2003 | Nguyen ........................ 166/278 |
| 6,632,527 B1 | 10/2003 | McDaniel et al. ............ 428/402 |
| 6,632,778 B1 | 10/2003 | Ayoub et al. ................. 507/202 |
| 6,632,892 B2 | 10/2003 | Rubinsztajn et al. ......... 525/476 |
| 6,642,309 B2 | 11/2003 | Komitsu et al. .............. 525/100 |
| 6,648,501 B2 | 11/2003 | Huber et al. .................. 366/301 |
| 6,659,179 B2 | 12/2003 | Nguyen ........................ 166/227 |
| 6,664,343 B2 | 12/2003 | Narisawa et al. ............. 525/474 |
| 6,667,279 B1 | 12/2003 | Hessert et al. ................ 507/225 |
| 6,668,926 B2 | 12/2003 | Nguyen et al. ............... 166/280 |
| 6,669,771 B2 | 12/2003 | Tokiwa et al. ................ 106/162.7 |
| 6,681,856 B1 | 1/2004 | Chatterji et al. .............. 166/294 |

| | | | | | |
|---|---|---|---|---|---|
| 6,686,328 B1 | 2/2004 | Binder .................. 510/446 | 2004/0261997 A1 | 12/2004 | Nguyen et al. .............. 166/281 |
| 6,705,400 B1 | 3/2004 | Nguyen et al. ........... 166/281 | 2005/0000731 A1 | 1/2005 | Nguyen et al. .............. 175/57 |
| 6,710,019 B1 | 3/2004 | Sawdon et al. ........... 507/136 | 2005/0006093 A1 | 1/2005 | Nguyen .................... 166/281 |
| 6,713,170 B1 | 3/2004 | Kaneka et al. ........... 428/323 | 2005/0006095 A1 | 1/2005 | Justus et al. ............... 166/295 |
| 6,725,926 B2 | 4/2004 | Nguyen et al. ........... 166/254.1 | 2005/0006096 A1 | 1/2005 | Nguyen et al. .............. 166/295 |
| 6,725,931 B2 | 4/2004 | Nguyen et al. ........... 166/280.2 | 2005/0034862 A1 | 2/2005 | Nguyen et al. .............. 166/281 |
| 6,729,404 B2 | 5/2004 | Nguyen et al. ........... 166/280.2 | 2005/0045326 A1 | 3/2005 | Nguyen .................... 166/278 |
| 6,732,800 B2 | 5/2004 | Acock et al. ............. 166/308 | 2005/0051331 A1 | 3/2005 | Nguyen et al. .............. 166/280.2 |
| 6,745,159 B1 | 6/2004 | Todd et al. ............... 703/10 | 2005/0277554 A1 | 12/2005 | Blauch et al. |
| 6,749,025 B1 | 6/2004 | Brannon et al. .......... 166/305.1 | 2006/0124303 A1 | 6/2006 | Nguyen et al. |
| 6,763,888 B1 | 7/2004 | Harris et al. ............. 166/305.1 | | | |
| 6,764,981 B1 | 7/2004 | Eoff et al. | | FOREIGN PATENT DOCUMENTS | |
| 6,766,858 B2 | 7/2004 | Nguyen et al. ........... 166/300 | EP | 0313243 B1 | 10/1988 |
| 6,776,236 B1 | 8/2004 | Nguyen .................... 166/279 | EP | 0528595 A1 | 8/1992 |
| 6,832,650 B2 | 12/2004 | Nguyen et al. ........... 166/279 | EP | 0506934 A | 10/1992 |
| 6,851,474 B2 | 2/2005 | Nguyen .................... 166/279 | EP | 0510762 A2 | 11/1992 |
| 6,887,834 B2 | 5/2005 | Nguyen et al. ........... 507/221 | EP | 0643196 A2 | 6/1994 |
| 6,928,709 B2 | 8/2005 | McMillan et al. | EP | 0834644 A2 | 4/1998 |
| 6,978,836 B2 | 12/2005 | Nguyen et al. ........... 166/295 | EP | 0853186 A2 | 7/1998 |
| 7,007,752 B2 | 3/2006 | Reddy et al. | EP | 0864726 A2 | 9/1998 |
| 7,013,976 B2 | 3/2006 | Nguyen et al. | EP | 0879935 B1 | 11/1998 |
| 7,017,665 B2 | 3/2006 | Nguyen | EP | 0933498 A1 | 8/1999 |
| 7,025,134 B2 | 4/2006 | Byrd et al. | EP | 1001133 A1 | 5/2000 |
| 7,032,667 B2 | 4/2006 | Nguyen et al. | EP | 1132569 A2 | 9/2001 |
| 7,040,403 B2 | 5/2006 | Nguyen et al. | EP | 1326003 A1 | 7/2003 |
| 7,059,406 B2 | 6/2006 | Nguyen | EP | 1362978 A1 | 11/2003 |
| 7,114,570 B2 | 10/2006 | Nguyen et al. | EP | 1394355 A1 | 3/2004 |
| 7,131,491 B2 | 11/2006 | Blauch et al. | EP | 1396606 A2 | 3/2004 |
| 7,156,194 B2 | 1/2007 | Nguyen | EP | 1398460 A1 | 3/2004 |
| 7,204,311 B2 | 4/2007 | Welton et al. | EP | 1403466 A2 | 3/2004 |
| 7,211,547 B2 | 5/2007 | Nguyen | EP | 1464789 A1 | 10/2004 |
| 7,237,609 B2 | 7/2007 | Nguyen | EP | 1607572 | 12/2005 |
| 7,255,169 B2 | 8/2007 | Van Batenburg et al. | GB | 1107584 | 3/1968 |
| 7,267,171 B2 | 9/2007 | Dusterhoft et al. | GB | 1264180 | 12/1969 |
| 7,281,580 B2 | 10/2007 | Nguyen et al. | GB | 1292718 | 10/1975 |
| 7,299,875 B2 | 11/2007 | Nguyen et al. | GB | 2298440 | 9/1996 |
| 7,334,635 B2 | 2/2008 | Nguyen | GB | 2382143 A | 4/2001 |
| 7,334,636 B2 | 2/2008 | Nguyen | WO | WO 93/15127 | 8/1993 |
| 7,343,973 B2 | 3/2008 | Dusterhoft et al. | WO | WO 94/07949 | 4/1994 |
| 7,541,318 B2 | 6/2009 | Nguyen et al. | WO | WO 94/08078 | 4/1994 |
| 2001/0016562 A1 | 8/2001 | Muir et al. .............. 507/201 | WO | WO 94/08090 | 4/1994 |
| 2002/0043370 A1 | 4/2002 | Poe ........................ 166/250.07 | WO | WO 95/09879 | 4/1995 |
| 2002/0048676 A1 | 4/2002 | McDaniel et al. ........ 428/404 | WO | WO 97/11845 | 4/1997 |
| 2002/0070020 A1 | 6/2002 | Nguyen .................... 166/295 | WO | WO 99/27229 | 6/1999 |
| 2003/0006036 A1 | 1/2003 | Malone et al. .......... 166/250.12 | WO | WO 01/81914 | 11/2001 |
| 2003/0060374 A1 | 3/2003 | Cooke, Jr. ................ 507/200 | WO | WO 01/87797 A1 | 11/2001 |
| 2003/0114314 A1 | 6/2003 | Ballard et al. ............. 507/100 | WO | WO 02/12674 A1 | 2/2002 |
| 2003/0130133 A1 | 7/2003 | Vollmer .................... 507/100 | WO | WO 03/027431 A1 | 4/2003 |
| 2003/0131999 A1 | 7/2003 | Nguyen et al. ........... 166/280 | WO | WO 2004/009956 | 1/2004 |
| 2003/0148893 A1 | 8/2003 | Lunghofer et al. ......... 507/200 | WO | WO 2004/037946 A1 | 5/2004 |
| 2003/0186820 A1 | 10/2003 | Thesing .................... 507/200 | WO | WO 2004/038176 A1 | 5/2004 |
| 2003/0188766 A1 | 10/2003 | Banerjee et al. .................. 134/7 | WO | WO 2004/083600 | 9/2004 |
| 2003/0188872 A1 | 10/2003 | Nguyen et al. ........... 166/308 | WO | WO 2005/021928 | 3/2005 |
| 2003/0196805 A1 | 10/2003 | Boney et al. ............. 166/280 | WO | WO 2005/021928 A2 | 3/2005 |
| 2003/0205376 A1 | 11/2003 | Ayoub et al. ............ 166/254.2 | | | |
| 2003/0230408 A1 | 12/2003 | Acock et al. ............. 166/297 | | OTHER PUBLICATIONS | |
| 2003/0234103 A1 | 12/2003 | Lee et al. ................ 166/293 | | | |
| 2004/0000402 A1 | 1/2004 | Nguyen et al. ........... 166/280 | International Search Report and Opinion (PCT/GB2004/002968), Nov. 16, 2004. | | |
| 2004/0014607 A1 | 1/2004 | Sinclair et al. ............ 507/200 | | | |
| 2004/0014608 A1 | 1/2004 | Nguyen et al. ........... 507/200 | International Search Report and Opinion (PCT/GB2004/004242), Feb. 10, 2005. | | |
| 2004/0040706 A1 | 3/2004 | Hossaini et al. .......... 166/278 | | | |
| 2004/0040708 A1 | 3/2004 | Stephenson et al. ....... 166/280.1 | International Search Report and Opinion (PCT/GB2004/000689), Jun. 4, 2004. | | |
| 2004/0040713 A1 | 3/2004 | Nguyen et al. ........... 166/295 | | | |
| 2004/0048752 A1 | 3/2004 | Nguyen et al. ........... 507/269 | International Search Report and Opinion (PCT/GB2004/002727), Mar. 11, 2005. | | |
| 2004/0055747 A1 | 3/2004 | Lee ........................ 168/278 | | | |
| 2004/0106525 A1 | 6/2004 | Willbert et al. .......... 507/200 | International Search Report and Opinion (PCT/GB2004/002948), May 24, 2005. | | |
| 2004/0138068 A1 | 7/2004 | Rimmer et al. .......... 507/100 | | | |
| 2004/0149441 A1 | 8/2004 | Nguyen et al. ........... 166/280.1 | Nguyen, et al., Controlling Proppant Flowback in High-Temperature, High-Production Wells, SPE 82215, May 2003. | | |
| 2004/0152601 A1 | 8/2004 | Still et al. ................ 507/100 | | | |
| 2004/0177961 A1 | 9/2004 | Nguyen .................... 166/280.2 | Dusterhoft, et al., Maximizing Effective Proppant Permeability Under High-Stress, High Gas-Rate Conditions, SPE 90398, Sep. 2004. | | |
| 2004/0194961 A1 | 10/2004 | Nguyen et al. ........... 166/295 | | | |
| 2004/0206499 A1 | 10/2004 | Nguyen et al. ........... 166/280.2 | | | |
| 2004/0211559 A1 | 10/2004 | Nguyen et al. ........... 166/276 | SPE 17154, "Key Factors for Enhanced Results of Matrix Stimulation," Paccaloni, et al., 1988. | | |
| 2004/0211561 A1 | 10/2004 | Nguyen et al. ........... 166/280.2 | | | |
| 2004/0221992 A1 | 11/2004 | Nguyen et al. ........... 166/295 | SPE 20623, "Advances in Matrix Stimulation Technology," Paccaloni, et al., 1993. | | |
| 2004/0231845 A1 | 11/2004 | Cooke, Jr. ................ 166/279 | | | |
| 2004/0231847 A1 | 11/2004 | Nguyen et al. ........... 166/295 | "Petroleum Productions Systems", Economidies Hill and Ehling-Economidies, pp. 364-368. | | |
| 2004/0256099 A1 | 12/2004 | Nguyen et al. ........... 166/249 | | | |
| 2004/0261995 A1 | 12/2004 | Nguyen et al. ........... 166/279 | | | |

"Santrol Bioballs"; http://www.fairmounminerals.com/.sub.-SANTROL/SANTROL%20Web%20Site/B.sub- .- TD.htm., Sep. 30, 2004.

International Search Report and Opinion (PCT/GB2004/002747), Mar. 11, 2005.

Halliburton, *CoalStim*<sup>SM</sup> *Service, Helps Boost Cash Flow From CBM Assets*, Stimulation, HO3679, Oct. 2003, 2003, Halliburton Communications.

Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 May 2004, 2004, Halliburton Communications.

Halliburton Technical Flier—Multi Stage Frac Completion Methods, 2 pages.

Halliburton "*CobraFrac*<sup>SM</sup> *Service, Coiled Tubing Fracturing—Cost-Effective Method for Stimulating Untapped Reserves*", 2 pages, 2004.

Halliburton "*CobraJetFrac*<sup>SM</sup> *Service, Cost-Effective Technology That Can Help Reduce Cost per BOE Produced, Shorten Cycle time and Reduce Capex*".

Halliburton Cobra Frac Advertisement, 2001.

Halliburton "*SurgiFrac*<sup>SM</sup> *Service, a Quick and cost-Effective Method to Help Boost Production From Openhole Horizonal Completions*", 2002.

Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, 2004, Halliburton Communications.

Almond et al., *Factors Affecting Proppant Flowback With Resin Coated Proppants*, SPE 30096, pp. 171-186, May 1995.

Nguyen et al., *A Novel Approach For Enhancing Proppant Consolidation: Laboratory Testing and Field Applications*, SPE Paper No. 77748, 2002.

SPE 15547, *Field Application of Lignosulfonate Gels to Reduce Channeling*, South Swan Hills Miscible Unit, Alberta, Canada, by O.R. Wagner et al., 1986.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, "*Water and Gas Cyclic Pulsing Method for Improved Oil Recovery*", SPE 3005, 1971.

Peng et al., "*Pressure Pulsing Waterflooding in Dual Porosity Naturally Fractured Reservoirs*" SPE 17587, 1988.

Dusseault et al, "*Pressure Pulse Workovers in Heavy Oil*", SPE 79033, 2002.

Yang et al., "*Experimental Study on Fracture Initiation by Pressure Pulse*", SPE 63035, 2000.

Nguyen et al., *New Guidelines For Applying Curable Resin-Coated Proppants*, SPE Paper No. 39582, 1997.

Kazakov et al., "*Optimizing and Managing Coiled Tubing Frac Strings*" SPE 60747, 2000.

Advances in Polymer Science, vol. 157, "*Degradable Aliphatic Polyesters*" edited by A.-C. Alberston, pp. 1-138, 2001.

Gorman, *Plastic Electric: Lining up the Future of Conducting Polymers* Science News, vol. 163, May 17, 2003.

Gidley et al., "*Recent Advances in Hydraulic Fracturing*," Chapter 6, pp. 109-130, 1989.

Simmons et al., "Poly(phenyllactide): Synthesis, Characterization, and Hydrolytic Degradation, *Biomacromolecules*", vol. 2, No. 2, pp. 658-663, 2001.

Yin et al., "*Preparation and Characterization of Substituted Polylactides*", Americal Chemical Society, vol. 32, No. 23, pp. 7711-7718, 1999.

Yin et al., "*Synthesis and Properties of Polymers Derived from Substituted Lactic Acids*", American Chemical Society, Ch.12, pp. 147-159, 2001.

Cantu et al., "*Laboratory and Field Evaluation of a Combined Fluid-Loss Control Additive and Gel Breaker for Fracturing Fluids*," SPE 18211, 1990.

Love et al., "*Selectively Placing Many Fractures in Openhole Horizontal Wells Improves Production*", SPE 50422, 1998.

McDaniel et al. "*Evolving New Stimulation Process Proves Highly Effective in Level 1 Dual-Lateral Completion*" SPE 78697, 2002.

Dechy-Cabaret et al., "*Controlled Ring-Operated Polymerization of Lactide and Glycolide*" American Chemical Society, Chemical Reviews,A-Z, AA-AD, 2004.

Funkhouser et al., "*Synthetic Polymer Fracturing Fluid For High-Temperature Applications*", SPE 80236, 2003.

*Chelating Agents*, Encyclopedia of Chemical Technology, vol. 5 (764-795).

Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available @ www.cdxgas.com/solution.html, printed pp. 1-2.

CDX Gas, "*What is Coalbed Methane?*" CDX, LLC. Available @ www.cdxgas.com/what.html, printed p. 1.

Halliburton brochure entitled "H2Zero™ Service Introducing The Next Generation of cost-Effective Conformance Control Solutions", 2002.

Halliburton brochure entitled INJECTROL® A Component:, 1999.
Halliburton brochure entitled "INJECTROL® G Sealant", 1999.
Halliburton brochure entitled "INJECTROL® IT Sealant", 1999.
Halliburton brochure entitled "INJECTROL® Service Treatment", 1999.
Halliburton brochure entitled "INJECTROL® U Sealant", 1999.
Halliburton brochure entitled "Sanfix® A Resin", 1999.
Halliburton brochure entitled "Pillar Frac Stimulation Technique" Fracturing Services Technical Data Sheet, 2 pages.

U.S. Appl. No. 10/751,593, filed Jan. 5, 2004, Nguyen, abandoned.
U.S. Appl. No. 10/775,347, filed Feb. 10, 2004, Nguyen, abandoned.
U.S. Appl. No. 10/793,711, filed Mar. 5, 2004, Nguyen, et al.
U.S. Appl. No. 10/852,811, filed May 25, 2004, Nguyen.
U.S. Appl. No. 10/860,951, filed Jun. 4, 2004, Stegent, et al.
U.S. Appl. No. 10/861,829, filed Jun. 4, 2004, Stegent, et al.
Foreign Counterpart and Written Opinion Application No. PCT/GB2005/003747, Sep. 29, 2005.
Office Action for U.S. Appl. No. 10/961,508 dated Dec. 6, 2006.
Office Action for U.S. Appl. No. 10/961,508 dated May 11, 2007.
Office Action for U.S. Appl. No. 10/961,508 dated Jan. 14, 2010.
Office Action for Russian Patent Application No. 2007117153 dated Dec. 15, 2009.
Notice of Allowance for U.S. Appl. No. 10/961,508 dated Apr. 13, 2010.
Notice of Allowance for U.S. Appl. No. 10/961,508 dated Jun. 3, 2010.

METHOD AND COMPOSITION FOR ENHANCING COVERAGE AND DISPLACEMENT OF TREATMENT FLUIDS INTO SUBTERRANEAN FORMATIONS

CROSS-REFERENCE TO RELATED APPLICATIONS

This application is a continuation of U.S. patent application Ser. No. 10/961,508, filed Oct. 8, 2004 now U.S. Pat. No. 7,757,768, which is herein incorporated by reference in its entirety.

BACKGROUND

The present invention relates to chemical treatments for oil and gas wells. More particularly, the present invention relates to methods and compositions for enhancing the coverage and displacement of treatment fluids into subterranean formations.

Chemical treatments for oil and gas wells often involve sequential injections of one or more fluids, such as a preflush, chemical agent, spacer, and/or afterflush. Typically treatment fluids are injected into a subterranean formation at the matrix flow rate, i.e., the rate at which the treatment fluid enters laminar flow inside the formation. At this rate the treatment fluid enters the interstitial spaces of the formation at a flow rate low enough to avoid generating areas of high pressure within the formation that could cause the formation to fracture inadvertently. The success of these treatments often relies on the effective coverage and displacement of one fluid by another. Unfortunately, problems of uneven distribution or placement of treatment fluids are often encountered in well bores containing multiple layers with highly variable permeabilities.

Previously, acid stimulation treatments have applied Paccaloni's maximum pressure differential and injection rate ("MAPDIR") method, which uses the injection rate as the key parameter to obtain a desired bottomhole pressure differential. However, Paccaloni's MAPDIR method and other methods involving high injection rates have not been widely adopted outside of acid stimulation treatments. This is due to the fact that many other treatment fluids, such as curable resins, are too viscous to be pumped into a formation at a flow rate sufficiently high enough to maximize the pressure differential without fear of inadvertently fracturing the formation. Furthermore, traditional solvents that could be used to lower the viscosity of the treatment fluids also tend to render the fluids less capable of adequately coating the formation, sometimes defeating the purpose of injecting the fluids into the formation.

SUMMARY

The present invention relates to chemical treatments for oil and gas wells. More particularly, the present invention relates to methods and compositions for enhancing the coverage and displacement of treatment fluids into subterranean formations.

A method of injecting a treatment fluid into a portion of a subterranean formation, comprising providing a treatment fluid having a viscosity; determining the breakdown pressure of the portion of the subterranean formation; calculating the maximum sustainable flow rate for the treatment fluid; and, injecting the treatment fluid into the portion of the subterranean formation at a flow rate less than or equal to the maximum sustainable flow rate for the treatment fluid.

A method of injecting a treatment fluid into a portion of a subterranean formation, comprising providing a treatment fluid having a viscosity; determining the breakdown pressure of the portion of the subterranean formation; calculating the maximum allowable treatment fluid viscosity; adjusting the viscosity of the treatment fluid to a viscosity less than or equal to the maximum allowable treatment fluid viscosity; and injecting the treatment fluid into the subterranean formation at the selected treatment fluid flow rate.

The features and advantages of the present invention will be readily apparent to those skilled in the art upon a reading of the description of the preferred embodiments that follows.

DESCRIPTION OF THE PREFERRED EMBODIMENTS

The present invention relates to chemical treatments for oil and gas wells. More particularly, the present invention relates to methods and compositions for enhancing the coverage and displacement of treatment fluids into subterranean formations.

In accordance with the present invention, a treatment fluid may be injected into a subterranean formation at a combination of a flow rate and a viscosity selected to maximize down hole pressure and yet remain below the "breakdown pressure." The term "breakdown pressure," as used herein, refers to a pressure at which the treating pressure exceeds the strength of the rock and the formation fractures. By injecting the treatment fluid at such a maximum down hole pressure, the method of the present invention allows for the enhanced coverage and displacement of the treatment fluid into the formation, often without the need for a diverting agent. In the methods of the present invention, the flow rate is generally selected by calculating the maximum sustainable flow rate that will not result in the fracturing of the formation, given the chosen viscosity of the treatment fluid. This flow rate may be thought of as the maximum rate condition that can be achieved while staying below the fracture gradient. In particular embodiments, the viscosity of the treatment fluid may also be adjusted in addition to, or in place of, adjusting the flow rate, to maximize the down hole pressure.

The ability to inject treatment fluids into a subterranean formation at or near the breakdown pressure of the formation may offer numerous benefits. In particular embodiments of the present invention, maximizing the down hole pressure by controlling the flow rate and/or the viscosity of the treatment fluid may allow the coverage of the treatment fluid to be extended into the subterranean formation, despite the presence of portions of the subterranean formation to be treated having areas of varying permeabilities along the length of the well bore. By maximizing the well bore pressure down hole without fracturing the formation, the highest possible pressure difference is created between the reservoir and the well bore, helping to force the treatment fluid to enter lower permeability regions of the formation that it might not have reached otherwise. Furthermore, in particular embodiments of the present invention, the coverage of a fluid in the formation and/or its displacement efficiency may be enhanced by adjusting the injection rate and/or viscosity of a later-introduced treatment fluid. Because each fluid in the treatment has its own viscosity, the injection rate of each fluid may be adjusted such that the maximum allowable injection pressure for each fluid is maintained while that fluid is being injected down hole without fracturing the formation. Thus, using tailored flow rates and tailored viscosities combined with MAPDIR pumping procedures, longer intervals of the well bore may be treated more effectively.

A variety of treatment fluids may be injected into a subterranean formation in accordance with teachings of the present invention. In some embodiments, the treatment fluid may comprise a curable resin. Other embodiments of the present invention may use a treatment fluid comprising a water controlling agent.

Resins suitable for use as treatment fluids in the present invention include all resins known in the art that are capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Water controlling agents may also be suitable treatment fluids in the present invention. A variety of agents have been used to reduce the water permeability of subterranean formations, such as surfactants formed of one or more fatty acid imidazolyl compounds and water-resistant polymers. Water-resistant polymers, also known as relative permeability modifiers, act, inter alia, to adsorb onto the surfaces within the pores of a formation to reduce the formation's water permeability. A variety of water-resistant polymers are suitable for use as water controlling agents in the present invention. Examples of particularly suitable polymers include, but are not limited to, polyacrylamide, hydrolyzed polyacrylamide, xanthan, scleroglucan, polysaccharides, amphoteric polymers made from acrylamide, acrylic acid, diallyldimethylammonium chloride, vinyl sulfonate/vinyl amide/acrylamide terpolymers, vinyl sulfonate/acrylamide copolymers, acrylamide/acrylamido-methylpropanesulfonic acid copolymers, acrylamide/vinylpyrrolidone copolymers, sodium carboxymethyl cellulose, poly [dialkylaminoacrylate-co-acrylate-g-poly(ethyleneoxide)], acrylamide/octadecyldimethylammoniummethyl methacrylate bromide copolymer, dimethylaminoethyl methacrylate/vinyl pyrrolidone/hexadecyldimethylammoniummethyl methacrylate bromide terpolymer, acrylamide/2-acrylamido-2-methyl propane sulfonic acid/2-ethylhexyl methacrylate terpolymer, and combinations thereof. As used herein "-g-" in a formula means that the immediately following molecule in the formula is grafted to the preceding polymer molecule.

Regardless of the chosen treatment fluid, before it is injecting into the subterranean formation, the breakdown pressure of the subterranean formation must first be determined. The breakdown pressure of the subterranean formation may be determined using a variety of techniques well-known in the art. Examples of such techniques include, but are not limited to, the analysis of Step Rate Injection Tests, Full Wave Sonic or Dipole Sonic logging tools for mechanical rock properties and stress, the analysis of borehole breakouts during drilling, and minifrac analysis. During treating the near well bore, it is preferable that the treating bottom hole pressure is maintained below that of the breakdown pressure. Because once the fractures are generated, the treatment fluids will tend to flow or leak off into the fractures, defeating the purpose of treating the near well bore area. With the benefit of this disclosure, it should be within the ability of one skilled in the art to select an appropriate method of determine the reservoir stress or fracture gradient.

Having determined the breakdown pressure of the subterranean formation, particular embodiments of the present invention manipulate the flow rate of the treatment fluid to maintain a down hole pressure less than the breakdown pressure of the formation. This flow rate may be calculated by determining the maximum sustainable flow rate that will not result in the fracturing of the formation, given the breakdown pressure of the formation and the viscosity of the treatment fluid to be injected into the formation. Assuming pseudo-steady-state flow, the maximum non-fracturing injection flow rate $q_{i,max}$ is related to the breakdown pressure, $p_{bd}$, by the following equation:

$$q_{i,max} = \frac{(p_{bd} - p_e)kh}{141.2\ \mu\left[\ln\left(\frac{r_b}{r_w}\right) + s\right]}$$

where $p_e$ is the average reservoir pressure, k is the permeability of the formation, h is the net pay, $\mu$ is the viscosity of the fluid, $r_b$ is the radius of the formation cylinder in which the majority of the pressure drop takes place, $r_w$ is the well bore radius, and s is the skin factor for the well bore. Additional information on the relationship between injection flow rates, fluid viscosities, and breakdown pressures may be found in MICHAEL J. ECONOMIDES, A DANIEL HILL & CHRISTINE EHLIG-ECONOMIDES, PETROLEUM PRODUCTION SYSTEMS CH. 14 (Prentice Hall Petroleum Engineering Series 1994) and G. PACCALONI, M. TAMBINI & M. GALOPPINO, KEY FACTORS FOR ENHANCED RESULTS OF MATRIX STIMULATION TREATMENTS, SPE 17154 (1988), the relevant disclosures of which are hereby incorporated by reference. In particular embodiments, the selected flow rate may be adjusted downwards from the maximum non-fracturing flow rate as an additional measure to further ensure the formation does not fracture inadvertently. In particular embodiments of the present invention, the selected flow rate may be range from about 80% to about 90% of the maximum non-fracturing flow rate. Additionally, the flow rate is typically monitored in real time to ensure that the desired flow rate is being achieved, as well as to determine when a sufficient amount of the treatment chemical has been injected into the formation.

In addition to, or in place of, manipulating the flow rate of the treatment fluid, particular embodiments of the present invention may manipulate the viscosity of the treatment fluid to maximize the bottom hole pressure of the well bore. Such viscosity manipulation may be particularly useful in cases wherein the treatment fluid is curable resin. By lowering the viscosity of curable resin it may possible to inject the resin into the subterranean formation at a higher flow rate. In particular embodiments of the present invention, this reduction in the viscosity of the curable resin may be accomplished by adding a solvent or dispersant to the treatment fluid. Examples of suitable solvents include, but are not limited to, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin composition chosen and is within the ability of one skilled in the art, with the benefit of this disclosure. Generally, the selected solvent is added to the treatment fluid until the treatment fluid has a lower, desired viscosity. In particular embodiments, the treatment fluid may have viscosity of about 5 to about 30 cP.

In addition to being used to introduce single fluids into a subterranean formation, particular embodiments of the present invention may also be used to introduce multiple fluids, in succession, into a subterranean formation. In accordance with the present invention, each fluid in the treatment may be injected in the formation at a flow rate tailored to viscosity of the individual fluid being injected, such that the down hole pressure is maximized for each fluid as it is injected. In addition to enhancing the coverage and displacement of the individual fluids at the time, such an injection technique may also enhance the coverage and/or displacement efficiency of the previously injected fluids, helping treat longer intervals of the well bore more effectively. Such tailoring of injection rate may be particularly useful in operations wherein placement of the treatment fluid is preceded by a preflush fluid and/or followed by the placement of an afterflush fluid.

Preflush fluids suitable for use in the methods of the present invention comprise an aqueous liquid, a surfactant, and an optional mutual solvent. The preflush solution, among other things, readies the formation to receive the integrated consolidation fluid and removes oils that may impede the integrated consolidation fluid from making contact with the formation particles. Suitable aqueous liquids that may be used to form the preflush fluid include, but are not limited to, fresh water, salt water, brine, combinations thereof, or any other aqueous liquid that does not adversely react with the other components used in accordance with this invention. When used, the mutual solvent should be soluble in both oil and water and be capable, among other things, of removing hydrocarbons deposited on particulates. Examples of suitable mutual solvents include, but are not limited to, glycol ethers. Some suitable glycol ethers include ethyleneglycolmonobutyl ether, diethylene glycol monomethyl ether, diethylene glycol dimethyl ether, dipropylene glycol methyl ether, and combinations thereof. Any surfactant compatible with the aqueous liquid and capable of aiding the hardenable resin in coating the surface of unconsolidated particles of the subterranean formation may be suitable for use in the present invention. Examples of surfactants suitable for use in the preflush fluids used in the methods of the present invention include, but are not limited to, ethoxylated nonyl phenol phosphate esters, one or more cationic surfactants, one or more nonionic surfactants, an alkyl phosphonate surfactant (e.g., a $C_{12}$-$C_{22}$ alkyl phosphonate surfactant), and mixtures thereof. Some suitable mixtures of one or more cationic and nonionic surfactants are described in U.S. Pat. No. 6,311,773 issued to Todd et al. on Nov. 6, 2001, the disclosure of which is incorporated herein by reference.

The afterflush fluids suitable for use in the methods of the present invention comprise an aqueous liquid or an inert gas. Where the afterflush fluid is an aqueous liquid, it may be fresh water, salt water, brine, or any other aqueous liquid that does not adversely react with the other components used in accordance with this invention. Where an aqueous afterflush fluid is used, a volume of about 1 to about 5 times the volume of the integrated consolidation fluid used is generally suitable for use in the methods of the present invention. Moreover, in some subterranean formations, particularly gas-producing subterranean formations, it may be advantageous to use afterflush fluids that are inert gases, such as nitrogen, rather than an aqueous solution. Such afterflush fluids may prevent adverse interactions between the afterflush fluid and the formation. The afterflush fluid acts, inter alia, to displace the curable resin from the well bore, to remove curable resin from the pore spaces inside the subterranean formation thereby restoring permeability, and to leave behind some resin at the contact points between formation sand particulate to form a permeable, consolidated formation.

In some embodiments, the afterflush fluid further comprises a surfactant. When used, any surfactant compatible with the aqueous liquid and capable of aiding the hardenable resin in coating the surface of unconsolidated particles of the subterranean formation may be suitable for use in the present invention. Examples of surfactants suitable for use in the afterflush fluids used in the methods of the present invention include, but are not limited to, ethoxylated nonyl phenol phosphate esters, one or more cationic surfactants, and one or more nonionic surfactants, and an alkyl phosphonate surfactant (e.g., a $C_{12}$-$C_{22}$ alkyl phosphonate surfactant). Mixtures of one or more cationic and nonionic surfactants are suitable and examples are described in U.S. Pat. No. 6,311,773 issued to Todd et al. on Nov. 6, 2001, the disclosure of which is incorporated herein by reference.

In some embodiments of the present invention a preflush fluid comprising a water controlling agent may be placed into a portion of a subterranean formation, followed by the placement of a resin treatment fluid, optionally followed by an afterflush fluid. In such embodiments, generally, at least one water controlling agent is included in the preflush fluid in an amount sufficient to reduce the production of water from the formation. In one embodiment, the water controlling agent is included in the preflush fluid in the range of from about 0.01% to about 10% by weight of the preflush fluid. In another embodiment, the water controlling agent is included in the preflush fluid in the range of from about 0.1% to about 1% by weight of the preflush fluid.

To facilitate a better understanding of the present invention, the following examples of preferred embodiments are given. In no way should the following examples be read to limit or define the scope of the invention.

Examples

A fluid placement simulation was performed to illustrate the effectiveness of the method provided therein. The simulation involved a well bore having three intervals, having permeabilities of 5,000 mD, 1,000 mD, and 500 mD, consecutively, and a reservoir pressure of 2,000 psi at a depth of 5,000 ft. For simulation purpose, an interval length of 10 ft is assumed for each interval. Using a treatment fluid with viscosity of 1 cP, the treatment fluid was injected into the well at 2, 4, 6, and 8 barrels per minute to determine the effect of injection rate on the penetration distance of the treatment fluid into the formation. It was found that most of the treatment fluid penetrates the 5,000-mD interval, and only a small amount of treatment fluid enters the lower permeability intervals. Even as the injection rate was increased to a higher rate, the penetration depth of treatment fluid into the 500 mD interval was increased just a little.

| Permeability of Interval | Depth of Penetration (inches) of 1-cP Fluid at 8 barrel/min Injection Rate |
|---|---|
| 5,000 mD | 10 |
| 1,000 mD | 3 |
| 500 mD | 1 |

As the viscosity of the fluid was increased to 7 cP, a dramatic improvement in the penetration of treatment fluid into all intervals was observed, especially at high injection rate. It was observed that the depth of penetration of treatment fluid into the low permeability intervals of 1,000 mD and 500 mD increased significantly. The increase in viscosity of treatment fluid provides resistance to penetration of the fluid into the high permeability interval, allowing the fluid to divert and penetrate into the lower-permeability intervals.

| Permeability of Interval | Depth of Penetration (inches) of 7-cP Fluid at 8 barrel/min Injection Rate |
|---|---|
| 5,000 mD | 14 |
| 1,000 mD | 8 |
| 500 mD | 7 |

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of injecting a treatment fluid into a portion of a subterranean formation having a wellbore therein, comprising:
   providing a treatment fluid having a viscosity;
   determining the breakdown pressure of the portion of the subterranean formation;
   mathematically calculating a maximum sustainable flow rate for the treatment fluid based on: the determined breakdown pressure; the average pressure and permeability of the portion of the subterranean formation; the treatment fluid viscosity; the net pay; the radius of the formation cylinder in which the majority of the pressure drop takes place; and the radius and skin factor of the wellbore; and,
   injecting the treatment fluid into the portion of the subterranean formation at a flow rate less than or equal to the maximum sustainable flow rate for the treatment fluid.

2. The method of claim 1 wherein the treatment fluid comprises a water controlling agent.

3. The method of claim 2 wherein the water controlling agent comprises a surfactant formed of one or more fatty acid imidazolyl compounds, a water-resistant polymer, or a combination thereof.

4. The method of claim 1 wherein the treatment fluid comprises a curable resin.

5. The method of claim 4 wherein the resin comprises a two component epoxy based resin, a novolak resin, a polyepoxide resin, a phenol-aldehyde resin, a urea aldehyde resin, a urethane resin, a phenolic resin, a furan resin, a furan/furfuryl alcohol resin, a phenolic/latex resin, a phenol formaldehyde resin, a polyester resin, a hybrid polyester resin, a copolymer polyester resin, a polyurethane resin, a hybrid polyurethane resin, a copolymer polyurethane resin, an acrylate resin, or a combination thereof.

6. The method of claim 5 wherein the treatment fluid further comprises an internal catalyst or activator.

7. The method of claim 4 wherein the treatment fluid comprises a solvent.

8. The method of claim 1 wherein the viscosity of the treatment fluid is from about 5 to about 30 cP.

9. The method of claim 1 wherein the flow rate at which the treatment fluid is injected into the portion of the subterranean formation is less than or equal to about 90% of the maximum sustainable flow rate.

10. The method of claim 1 wherein the flow rate at which the treatment fluid is injected into the portion of the subterranean formation is less than or equal to about 80% of the maximum sustainable flow rate.

11. The method of claim 1 wherein the portion of the subterranean formation comprises a plurality of areas having distinct permeabilities.

12. The method of claim 1 further comprising the steps of:
   providing a preflush fluid having a viscosity;
   calculating a maximum sustainable flow rate for the preflush fluid, knowing the viscosity of the preflush fluid at which the preflush fluid can be injected without causing the portion of the subterranean formation to breakdown; and, before the step of injecting the treatment fluid into the portion of the subterranean formation,
   injecting the preflush fluid into the portion of the subterranean formation at a flow rate less than or equal to the maximum sustainable flow rate for the preflush fluid.

13. The method of claim 12 wherein the preflush fluid comprises an aqueous liquid and a surfactant.

14. The method of claim 13 wherein the preflush fluid further comprises a mutual solvent.

15. The method of claim 12 further comprising the steps of:
   providing an afterflush fluid having a viscosity;
   calculating a maximum sustainable flow rate for the afterflush fluid; and, after the step of injecting the treatment fluid into the portion of the subterranean formation,
   injecting the afterflush fluid into the portion of the subterranean formation at a flow rate less than or equal to the maximum sustainable flow rate for the afterflush fluid.

16. The method of claim 15 wherein the afterflush fluid comprises an aqueous liquid and a surfactant.

17. The method of claim 16 wherein the surfactant comprises an ethoxylated nonyl phenol phosphate ester, a cationic surfactant, a nonionic surfactant, an alkyl phosphonate surfactant, or a combination thereof.

18. The method of claim 1 further comprising the steps of:
providing an afterflush fluid having a viscosity;
calculating a maximum sustainable flow rate for the afterflush fluid; and, after the step of injecting the treatment fluid into the portion of the subterranean formation, injecting the afterflush fluid into the portion of the subterranean formation at a flow rate less than or equal to the maximum sustainable flow rate for the afterflush fluid.

19. The method of claim 18 wherein the afterflush fluid comprises an aqueous liquid and a surfactant.

20. The method of claim 19 wherein the surfactant comprises an ethoxylated nonyl phenol phosphate ester, a cationic surfactant, a nonionic surfactant, an alkyl phosphonate surfactant, or a combination thereof.

* * * * *